April 28, 1925.

P. GANZ

DISPENSING MACHINE

Filed June 3, 1924    3 Sheets-Sheet 1

1,535,915

WITNESSES:

INVENTOR,
Philip Ganz.
BY
ATTORNEYS

April 28, 1925.

P. GANZ 1,535,915

DISPENSING MACHINE

Filed June 3, 1924

WITNESSES:

INVENTOR,
Philip Ganz.
BY
ATTORNEYS.

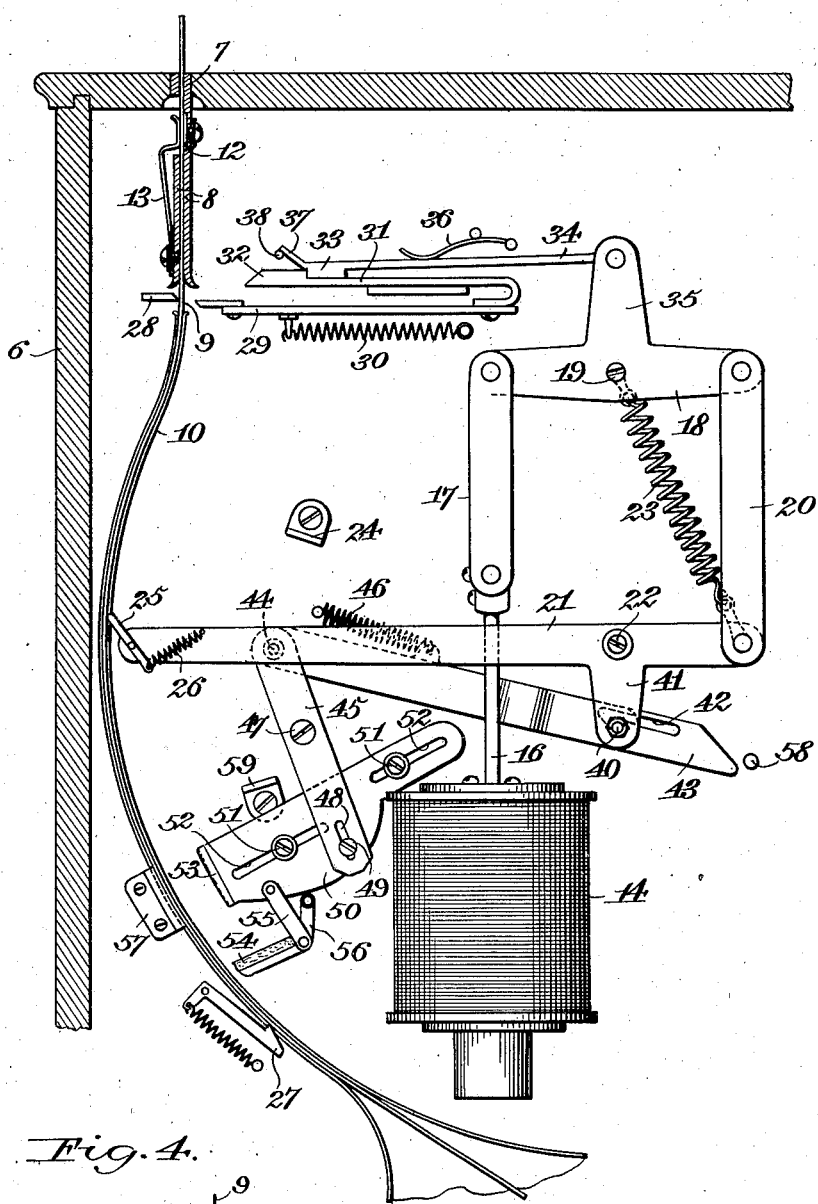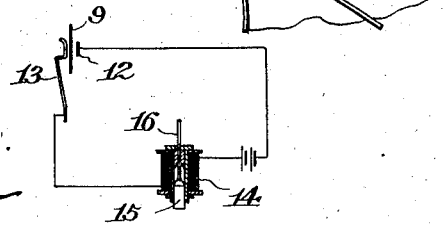

Patented Apr. 28, 1925.

1,535,915

UNITED STATES PATENT OFFICE.

PHILIP GANZ, OF NEW YORK, N. Y.

DISPENSING MACHINE.

Application filed June 3, 1924. Serial No. 717,626.

*To all whom it may concern:*

Be it known that I, PHILIP GANZ, a citizen of the United States, and a resident of the city of New York, borough of Manhattan, in the county and State of New York, have invented a new and Improved Dispensing Machine, of which the following is a full, clear, and exact description.

This invention relates to improvements in dispensing machines, and has particular reference to a check or ticket dispensing machine.

The machine of the present invention is particularly designed for use in restaurants, motion picture theatres and other like places. For purposes of this description the checks or tickets will be hereinafter referred to merely as checks, it being understood that this term is indicative of any article capable of being delivered by the machine. When used in a restaurant the machine is employed to deliver a check to each customer as he enters the establishment, the check in this instance being generally marked with numbers representing fractions of a dollar. The check is punched by an attendant to indicate the amount of food purchased and subsequently the customer pays the cashier an amount equal to the punched number of greatest value.

An object of the present invention is to so construct the machine that a check is always in position to be removed therefrom and the act of removal is utilized to cause another check to be automatically moved into delivering position and to print or stamp on one of the checks to be delivered suitable indicia such as the name of an establishment. In carrying out the generic idea, as above expressed, it is of no consequence whether the checks consist of individual pieces of material, or are connected together to form a continuous strip, the latter form, however, being preferable.

Another object is to control the feeding of the checks to a delivering position by the actuation of an oscillatory check-feeding member the operation of which is governed by the removal of a check from said position.

A further object is to utilize each operation of the check-feeding member to sever the strip of which each check forms a part and to print one of the checks prior to its movement to a delivering position.

The above and other objects will appear more clearly from the following detailed description, when taken in connection with the accompanying drawings, which illustrate a preferred embodiment of the inventive idea.

In the drawings—

Figure 3 is a view similar to Figure 1 showing the position of the parts just prior to the cutting and printing operations;

Figure 4 is a diagrammatic view showing the circuit for operating the electromagnet employed as a part of the operating mechanism.

Figure 5:
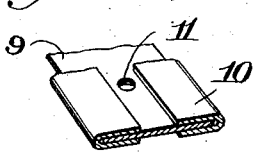
Figure 5 is a fragmentary perspective view of the check strip and guide therefor.

The drawings show, as a preferred form of the invention, a casing 6 designed to enclose the operating mechanism and having in its top a delivery slot 7 with which is aligned a pair of guide members 8 between which a check from the strip 9 is projected to a delivering position in said slot. Also aligned with the guides 8 is a guide 10 having its edges bent to form a channel, as best illustrated in Figure 5, in which the strip is movable. Adjacent edges of the members forming the guide 10 are spaced to expose the central portion of the strip which, at intervals, is provided with a plurality of openings 11 therein for a purpose which will presently appear. The strip constituting the checks is preferably disposed in a suitable magazine (not shown) and the free end of the strip is initially inserted into the lower end of the guide 10 and moved therethrough until said free end is projected through the slot 7. A manual operation of the cutting mechanism, later to be described, may then be effected in any suitable manner to sever the end of the strip. Then by withdrawing said severed end an automatic operation of the machine will result and all subsequent operations will be automatically controlled until the strip is exhausted.

Figure 1:
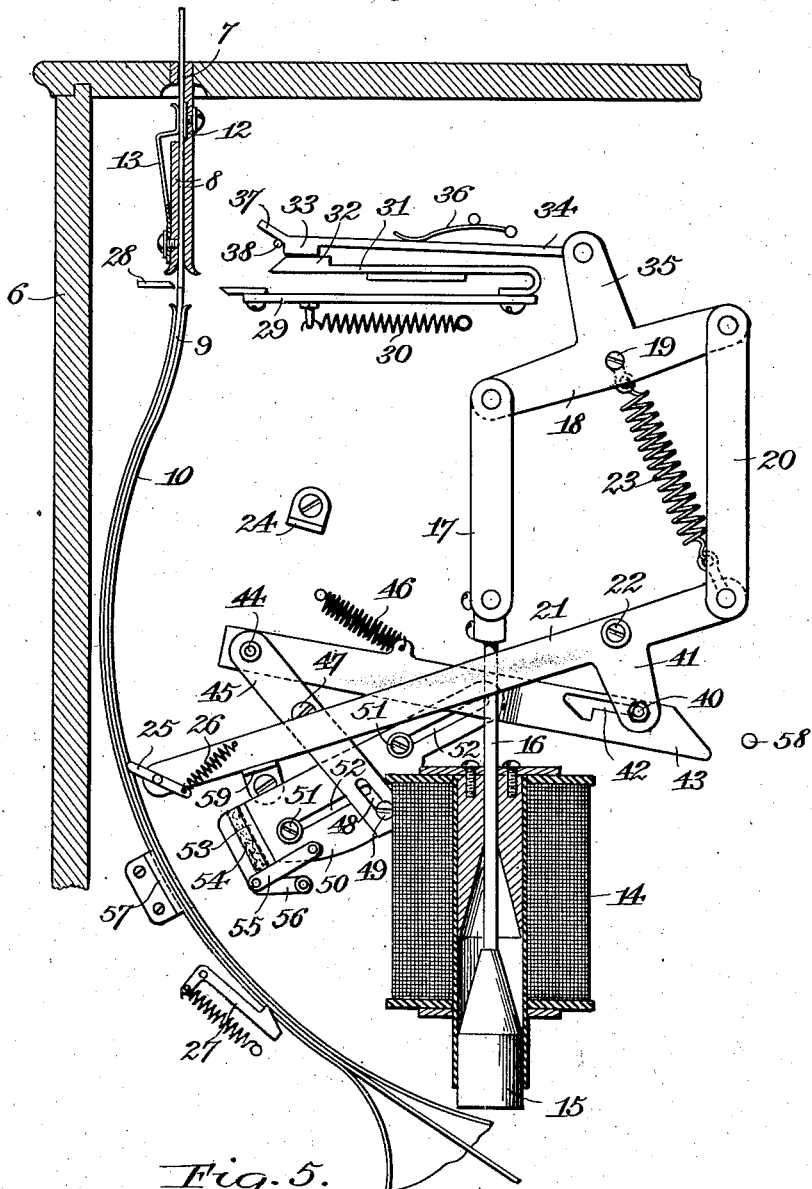
Figure 1 is an elevational view, partly in section, of the mechanism constituting the machine, the parts being shown in their normal positions.

As previously stated the operation of the machine is initiated by the removal from the slot 7 of the check which has been severed from the strip by a previous operation of the cutting mechanism. By reference to Figure 1 it will be seen that when the severed check is removed the contacts 12 and 13 forming a switching device will be permitted to engage with each other owing to the resiliency of the latter contact. This engagement closes an obvious circuit (shown in Figure 4) for energizing the electromagnet 14 which then attracts its solenoid 15 to move the same longitudinally into the core of the magnet. This movement is transmitted through the rod 16 to the link 17 one end of which is pivotally connected to one end of a rocking member 18 in the form of a double bell crank pivoted to a wall of the casing 6. The opposite end of the member 18 has pivotally connected thereto one end of a link 20 the other end of which is pivotally connected to an adjacent end of an oscillatory strip feeding member 21 pivotally mounted at 22. As the member 18 is rocked the member 21 is also swung about its pivot against the tension of the coil spring 23 until said member 21 engages the stop 24 at which time the parts are in the position shown in Figure 2. This initial movement of the member 21 is utilized to advance the strip 9 to project the free end through the slot 7, to prepare the cutting mechanism for its operation of severing the strip to form a check, and to also effect the initial step in the operation of the printing mechanism, the two latter operations occurring upon the return movement of the member 21 to its normal position. To advance the strip 9 the member 21 has pivoted thereto at the end remote from its pivot 22 a catch 25 yieldably held in engagement with the strip 9 by means of a spring 26 and having one end disposed between the members of the guide 10 so that as said arm starts to move in the direction described said catch will engage in one of the openings 11 in the strip and force the same along the guide 10 until the free extremity is projected through the slot 7. As the arm approaches the stop 24 the extremity of the strip will pass between the contacts 12 and 13 and again separate the same to open the circuit for the electromagnet 7 which then becomes deenergized to restore its solenoid 15 to its normal position. However, the momentum of the solenoid and other parts connected thereto is such that the arm 21 will continue its initial movement until the same engages the stop 24. In order that the strip 9 will be securely maintained in its advanced position a spring-actuated detent 27 is provided, the free end of which will engage any one of the openings 11 after the strip has been advanced to hold said strip in such position and at the same time being again advanced upon the next operation of the machine.

The cutting mechanism which is utilized to sever the strip preferably comprises a stationary cutting blade 28 arranged adjacent the strip 9 at the point where the same passes between the guides 8 and 10 and the movable cutting member 29 yieldably held in its inoperative position by means of the coil spring 30 which is utilized to restore the cutting member 29 to its normal position after the cutting operation. This member 29 carries an arm 31 arranged above said member and having an enlargement 32 at its free end capable of being engaged by the enlarged end 33 of a pawl 34 pivotally connected to the extension 35 of the rocking member 18. A leaf spring 36 engages the pawl 34 and is utilized to yieldably maintain the enlarged end 33 in engagement with the arm 31 at all times. Thus when the member 18 is rocked to the position shown in Figure 2, the pawl 34 will assume the position shown in said figure with the enlarged end 33 thereof arranged in back of the enlargement 32 of the arm 31. The parts of the cutting mechanism are now in the position to be actuated to sever the strip upon the return movement of the member 18, which movement starts as soon as the member 21 engages the stop 24 and the solenoid 15 begins its return movement. The parts are shown in Figure 3 about midway of this return movement and by referring to said figure it will be seen that the movable cutting member 29 is approaching the strip 9. This movement of the member 29 is caused by a movement in the same direction of the pawl 34 with its enlarged end 33 in engagement with the end 32 of the member 29. Just previous to the engagement of the cutting member 29 with the strip a diagonally extending lip 37 formed upon the enlarged end 33 of the pawl 34 engages an abutment or pin 38 which, as the pawl continues, causes the same to be swung away from the arm 31 against the tension of the spring 36 to disengage the enlarged end 33 from in back of the enlargement 32 so that after the member 29 has completed its cutting operation the same will be free to restore to its normal position under the influence of the spring 30. As the rocking member 18 is being returned to its normal position a similar movement of the arm 21 is also effected and this latter movement is aided by the coil spring 23.

Referring now to the operation of the printing mechanism it will be noted that during the initial movement of the member 21 toward the stop 24 the bolt 40 carried by the extension 41 of the said member 21 will move longitudinally toward the enlarged end of the bayonet slot 42 in the arm 43 adjacent one end thereof. During this movement the arm 43 will be rocked slightly about its pivotal connection 44 with the lever 45 and when the bolt 40 reaches the enlarged end of the slot the same will be engaged behind the shoulder formed by said enlarged end by reason of the tension of the coil spring 46 which swings the arm 43 upwardly so that the parts will then assume the position shown in Figure 2. The lever 45 is pivoted intermediate its ends at 47 and at the end thereof opposite its pivotal connection 44 with the arm 43 said lever is provided with a longitudinal slot 48 which receives a stud 49 carried by the reciprocating member or plate 50. The latter member is guided in its reciprocating movements by means of pins or studs 51 engageable in slots 52 in said member. The member 50 is movable toward and away from the strip 9 and is provided at its end adjacent said strip with a suitable facing 53 containing a stamp or the like with suitable indicia thereon adapted to be printed on the portion of the strip disposed in the path of movement of said member 50 as it is moved toward the strip. An inking pad 54 is also pivotally connected to the member 50 by a link 55 and to the wall of the casing by a link 56 so that as the member 50 is moved toward the strip the pad will be swung from the position shown in Figures 1 and 2 to that shown in Figure 3 so that the same will not interfere with the engagement of the facing 53 with the strip, said pad being returned to its normal position in engagement with said facing upon the return movement of the member 50. An abutment 57 is secured to the guide 10 at a point directly in the path of movement of the member 50 and is utilized to support the central portion of the strip 9 when the stamp carried by the member 50 comes in contact with said strip.

Figure 2:
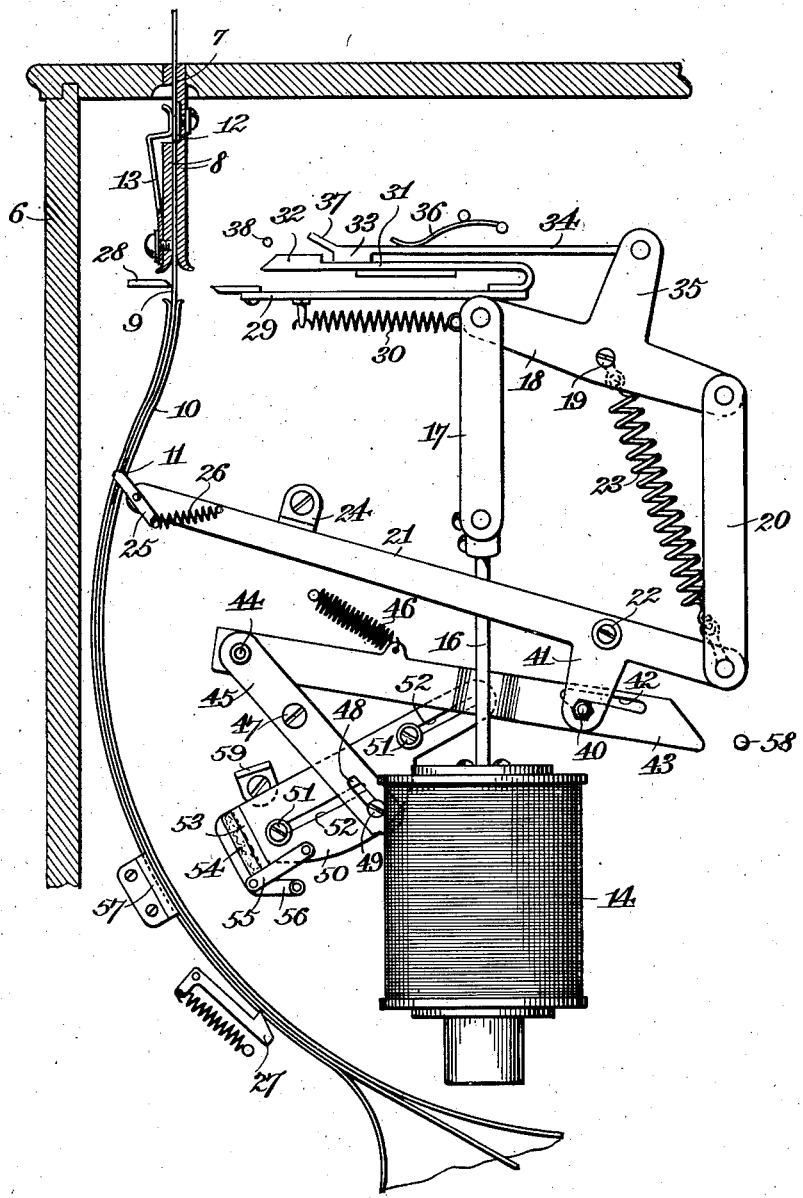
Figure 2 is a similar view with the parts in position illustrating an intermediate step in the operation following the withdrawal of the check from the machine.

Now at the beginning of the return movement of the arm 21 from the position shown in Figure 2 toward that shown in Figure 3 the engagement of the bolt 40 with the shoulder of the slot 42 will cause a movement of the arm 43 to the right, as viewed in the drawings, and toward the pin or abutment 58. This movement of the arm 43 expands the spring 46 and rocks the lever 45 about its pivot 47. This movement of the lever is transmitted to the member 50 to produce a rectilinear movement thereof toward the strip 9 and it is at this time that the inking pad 54 is moved to the position shown in Figure 3. When the parts have reached the position shown in the latter figure the beveled end of the arm 43 is about to engage the pin 58 and continued movement of said arm and consequent engagement thereof with said pin will rock the arm slightly about its pivot 44 to disengage the bolt 40 from the shoulder of the slot 42. However, before this disengagement occurs the member 50 will have completed its stroke toward the strip and the latter will have been printed. It will be recalled that the movement of the arm 43 toward the pin 58 expanded the spring 46 so that when the pawl 40 is finally disengaged from the shoulder and positioned in the longitudinal portion of the slot 42 the retractile force of the spring 46 will restore the arm 43 to its normal position and in so doing will cause the lever 45 to similarly restore the member 50 which, through the links 55 and 56, again causes the inking pad to engage the facing 53. At this time the member 21 again engages its stop 59 and the cycle of operation has been completed.

What is claimed is:

1. In a check dispensing machine, a check feeding mechanism, means controlled by the act of removal of a check from the machine for operating said feeding mechanism, and means actuated by the operation of said feeding mechanism for printing a check.

2. In a check dispensing machine, a check feeding mechanism, an electromagnetic device for controlling the operation of said feeding mechanism, a switch controlled by the removal of a check from the machine for energizing said electromagnetic device, and a mechanism for printing the checks actuated by the operation of said feeding mechanism.

3. In a check dispensing machine, a check strip feeding mechanism, a cutting mechanism for severing an end of the strip to form a check, means controlled by the act of removal of said check from the machine for operating said feeding mechanism to advance said strip and for operating said cutting mechanism to sever another portion of the strip, and means for printing said strip each time the same is advanced.

4. In a check dispensing machine, a check strip feeding mechanism, means controlled by the act of removal of a check from the machine for operating said feeding mechanism to advance said strip, means for severing the end of the strip to form a check, means for printing said strip upon each advancement thereof, and means simultaneously operating said severing and printing means subsequent to said advancement.

5. In a check dispensing machine, a check feeding mechanism, an electromagnetic device controlled by the act of removal of a check from the machine to cause said feeding mechanism to be operated, and means actuated by the operation of said feeding mechanism for printing a check.

6. In a check dispensing machine, a check strip feeding mechanism, a cutting mechanism for severing an end of the strip to form a check, means for operating said feeding mechanism to advance said strip and for operating said cutting mechanism to sever another portion of the strip, and means for printing said strip each time the same is advanced.

7. In a check dispensing machine, a check strip feeding mechanism, means for operating said feeding mechanism to advance said strip, means for severing the end of the strip to form a check, means for printing said strip upon each advance thereof, and means simultaneously operating said severing and printing means subsequent to said advancement.

8. In a check dispensing machine, an oscillatory check strip feeding member engageable with the strip to advance the same, a cutting mechanism for severing the strip to form checks, and means controlled by the act of removing a check from the machine to cause the operation of said oscillatory member and said cutting mechanism.

9. In a check dispensing machine, an oscillatory check strip feeding member engageable with the strip to advance the same, a cutting mechanism for severing the strip to form checks, and means controlled by the act of removing a check from the machine to initially cause the operation of said oscillatory member and thereafter cause the operation of said cutting mechanism.

10. In a check dispensing machine, an oscillatory check strip feeding member engageable with the strip to advance the same, a cutting mechanism for severing the strip to form checks, a mechanism for printing each check, and means controlled by the act of removal of a check from the machine for causing the operation of said feeding member and cutting and printing mechanisms.

11. In a check dispensing machine, an oscillatory check strip feeding member engageable with the strip to advance the same, a cutting mechanism for severing the strip to form checks, a mechanism for printing each check, and means controlled by the act of removal of a check from the machine for initially causing the operation of said feeding mechanism and thereafter the simultaneous operation of said cutting and printing mechanisms.

12. In a check dispensing machine, an oscillatory strip feeding member engageable with the strip to advance the same when said member is moved in one direction, a cutting mechanism for severing a portion of the strip to form a check, and means controlled by the return movement of said member for causing the operation of said cutting mechanism.

13. In a check dispensing machine, an oscillatory strip feeding member engageable with the strip to advance the same when said member is moved in one direction, a cutting mechanism for severing a portion of the strip to form a check, means controlled by the return movement of said member for causing the operation of said cutting mechanism, and means also actuated upon the return movement of said member for printing said strip.

14. In a check dispensing machine, an oscillatory strip feeding member engageable with the strip to advance the same when said member is moved in one direction, a cutting mechanism for severing a portion of the strip to form a check, means controlled by the return movement of said member for causing the operation of said cutting mechanism, and means for operating said member controlled by the act of removal of a check from the machine.

15. In a check dispensing machine, an oscillatory strip feeding member engageable with the strip to advance the same when said member is moved in one direction, a cutting mechanism for severing a portion of the strip to form a check, means controlled by the return movement of said member for causing the operation of said cutting mechanism, means also actuated upon the return movement of said member for printing said strip, and means for operating said member controlled by the act of removal of a check from the machine.

16. In a check dispensing machine, a check feeding mechanism, means for advancing the checks to delivering position, a printing mechanism for the checks controlled by said feeding mechanism including a reciprocatory member having a printing face movable toward and away from said checks to print the same, and means controlled by the act of removal of a check from the machine for causing the operation of said feeding mechanism.

17. In a check dispensing machine, a check strip feeding mechanism operable to advance the strip, means for severing the strip to form a check, means engageable with the strip to retain the same in its advanced position, and means controlled by the act of removal of a check from the machine for causing the operation of said feeding and severing mechanisms.

18. In a check dispensing machine, a check strip feeding mechanism having initial and return movements, a cutting mechanism for the strip operable to sever the same to form a check and including stationary and movable cutting members, means operated by the initial movement of said feeding mechanism for engaging the movable cutting member preparatory to actuating the same and operated upon the return movement of said feeding mechanism to cause said movable member to cooperate with the stationary member to sever the strip.

PHILIP GANZ.